Feb. 7, 1961 D. L. HARSHMAN 2,970,431
ROTATING INLET FOR JET ENGINES
Filed Jan. 2, 1959 4 Sheets-Sheet 1
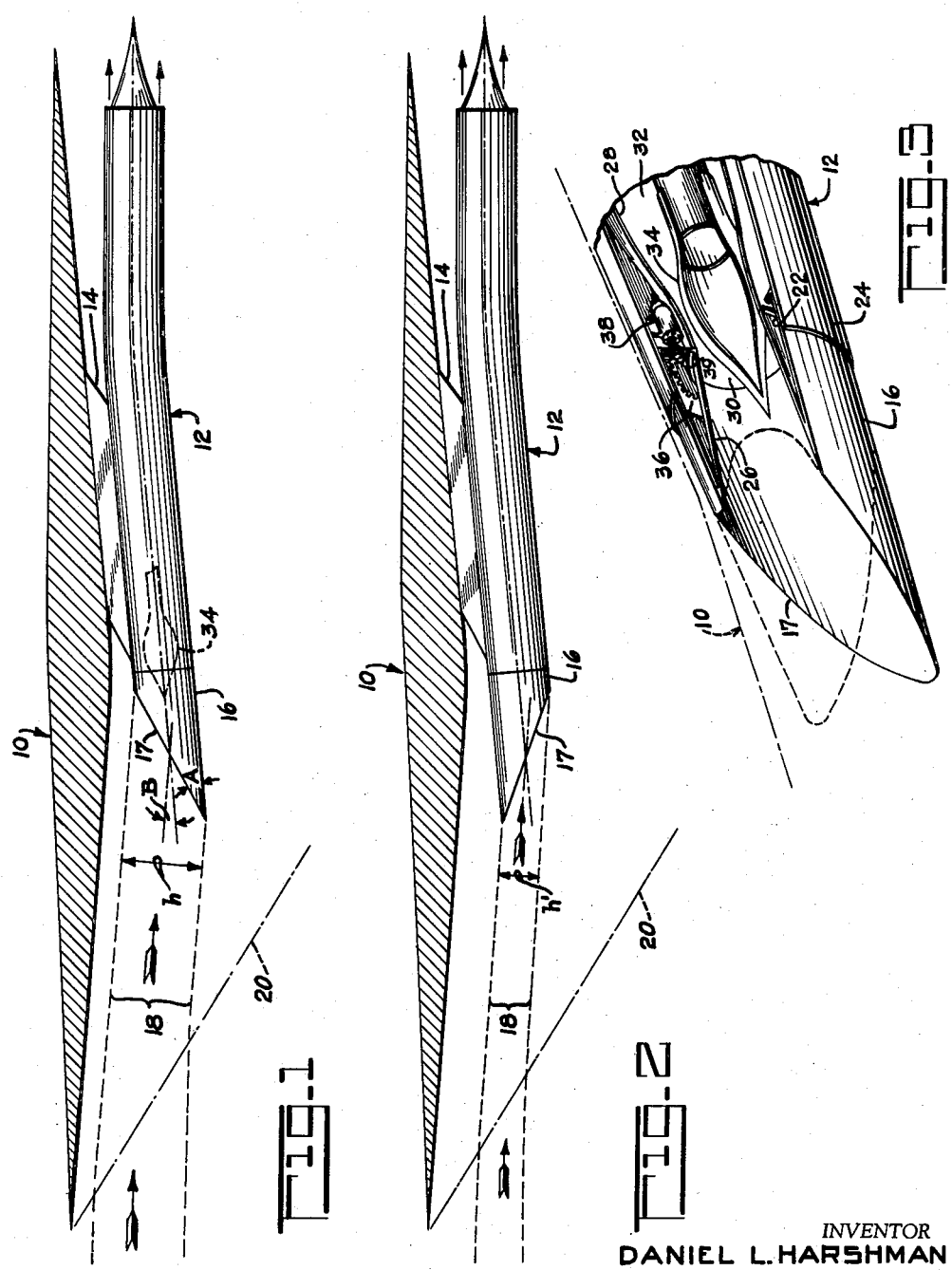
INVENTOR
DANIEL L. HARSHMAN
BY *Victor L. Behn*
ATTORNEY

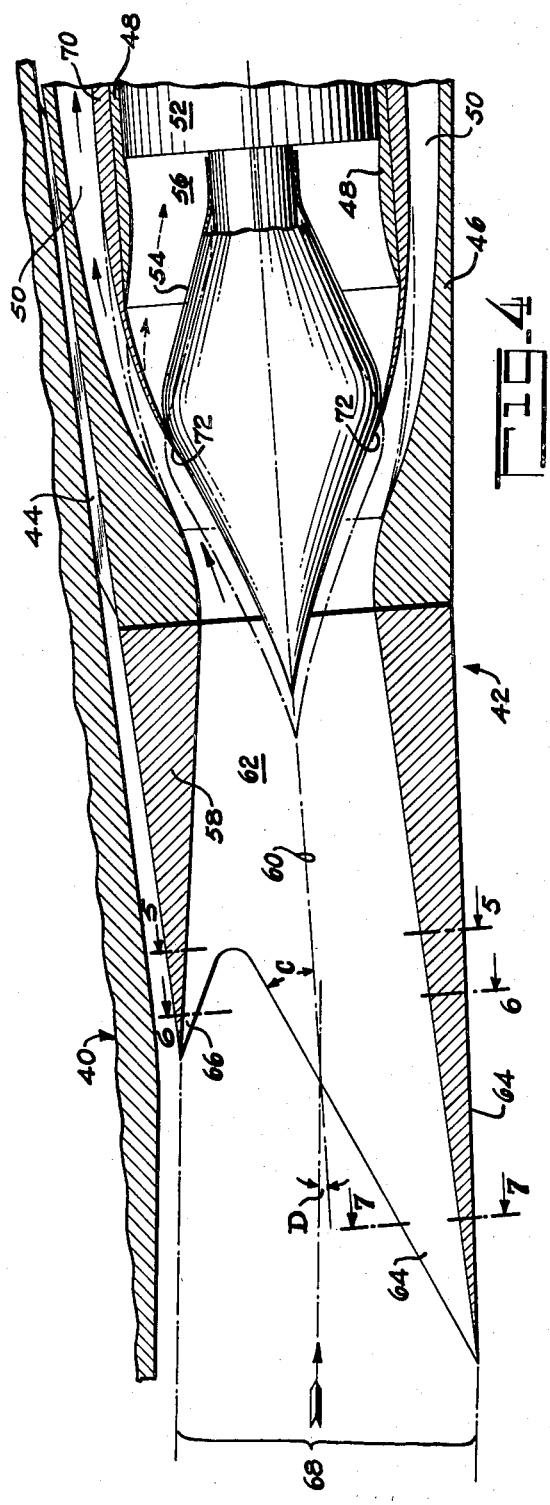
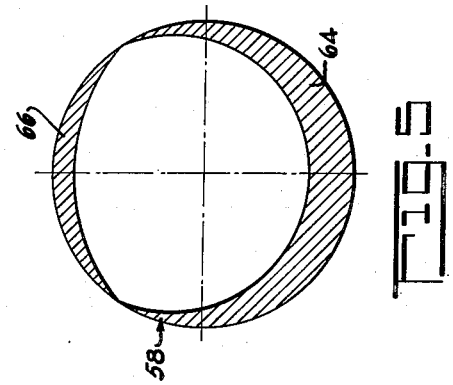
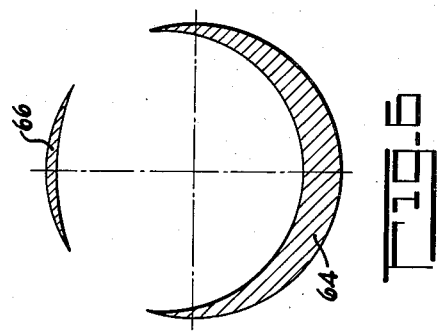
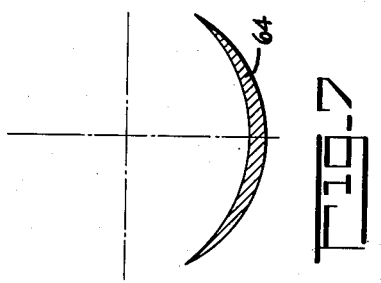
INVENTOR
DANIEL L. HARSHMAN

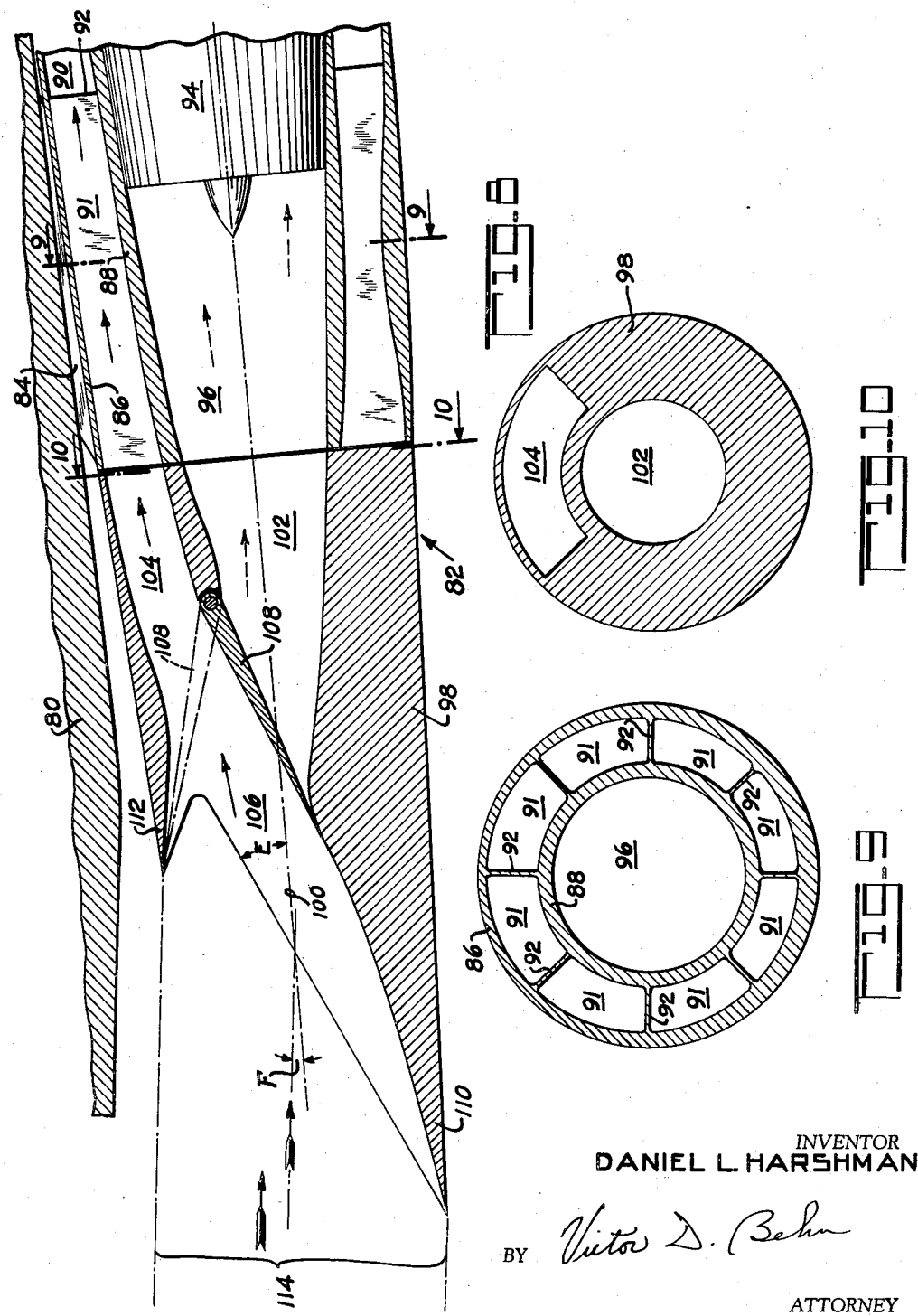

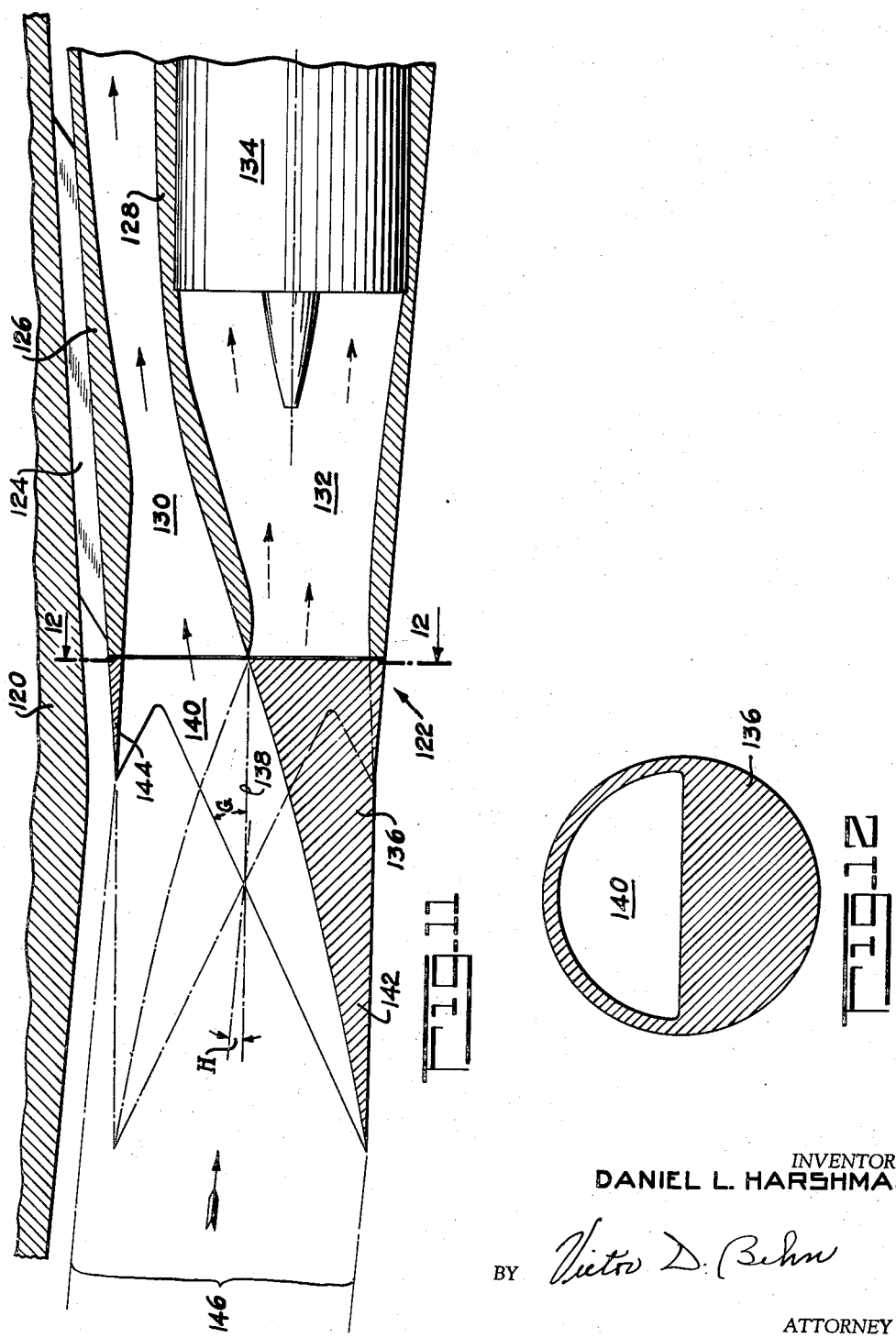

United States Patent Office 2,970,431
Patented Feb. 7, 1961

2,970,431
ROTATING INLET FOR JET ENGINES
Daniel L. Harshman, Forest Park, Ohio, assignor to Curtiss-Wright Corporation, a corporation of Delaware
Filed Jan. 2, 1959, Ser. No. 784,495
15 Claims. (Cl. 60—35.6)

This invention relates to jet engines and is particularly directed to air breathing engines.

Air breathing jet engines designed for supersonic flight over a wide speed range require an air inlet having a variable capture area. An object of this invention comprises the provision of a novel and simple jet engine air inlet construction having means for varying the inlet capture area such that said air inlet construction is relatively light in weight and requires only relatively low actuating forces to vary the inlet capture area. A further object of the invention comprises the provision of such an air inlet construction in which variation of the inlet capture area is effected by simple rotation of a hollow member through which the inlet air flows.

A still further object of the invention comprises the provision of a hollow air inlet extension at the forward end of the engine, said extension being rotatable to vary the air inlet capture area. Another object of the invention comprises the addition of means for varying the inlet throat area as well as the inlet capture area.

A compound-type power plant combining two or more air breathing jet engines into a single unit generally will be designed for operation over a wide range of air flow so that the invention is particularly applicable to such a power plant. An example of such a power plant is one consisting of a ramjet engine and a turbojet engine. In such a power plant the ramjet engine is used at the higher supersonic speeds while the turbojet engine is used at the lower supersonic speeds and the air inlet capture area required by the ramjet during its operation is substantially greater than that required by the turbojet during its operation.

A further object of the invention comprises the provision of a hollow air inlet extension for such a compound power plant in which said hollow extension is rotatable to vary the inlet capture area and in which means are provided to effect transition of the inlet air flow from one engine to the other.

Other objects of the invention will become apparent upon reading the annexed description along with the drawings in which:

Fig. 1 is a schematic view of a jet engine having an air inlet embodying the invention.

Fig. 2 is a view similar to Fig. 1 but illustrating the inlet in an alternate position.

Fig. 3 is a perspective view, partly cut away, of the inlet portion of Fig. 1.

Fig. 4 is a sectional view illustrating the invention applied to a compound power plant consisting of a turbojet engine and a ramjet engine.

Figs. 5, 6 and 7 are sectional views taken along lines 5—5, 6—6, and 7—7 respectively of Fig. 4.

Fig. 8 is a view similar to Fig. 4 but illustrating a modified construction.

Figs. 9 and 10 are sectional views taken along lines 9—9 and 10—10 respectively of Fig. 8.

Fig. 11 is another view similar to Fig. 4 but illustrating a further modification of the invention, and Fig. 12 is a sectional view taken along line 12—12 of Fig. 11.

Referring first to Figs. 1–3 of the drawing reference numeral 10 designates a wing or other portion of a supersonic aircraft from which an air breathing type of jet engine 12 is supported by a strut 14. The forward or air entrance end of the engine 12 is provided with a hollow member 16 forming an air inlet extension of the forward end of the engine 12 and is rotatably supported thereby. The hollow member 16 forms a smooth and co-axial forward continuation of the front end of the engine and is co-axial therewith.

During flight, a stream tube of air enters the hollow air inlet extension 16 of the engine 12, this stream tube being illustrated by dashed lines designated 18 in Figs. 1 and 2. Also illustrated in Figs. 1 and 2 is an oblique shock 20 which extends off the leading edge of the wing 10 during supersonic flight, said stream tubes 18 being bent slightly, as they pass thru said oblique shock.

The hollow air inlet member 16 is rotatable about its axis and said member has a sharp forward or leading edge 17 to the approaching air flow, said leading edge being cut back at an angle A to its axis so as to lie in a plane inclined to said axis. Also, the axis of the rotatable member 16 is inclined to the direction of the approaching stream tube 18 by a small angle B.

Fig. 1 illustrates the rotatable inlet member 16 in one position and Fig. 2 illustrates this member rotated 180° from its position of Fig. 1. As is apparent from Figs. 1 and 2 the height $h$ of the stream tube of air capable of entering the inlet member 16 in Fig. 1 is much greater than the corresponding height $h'$ of the stream tube of air capable of entering said member in Fig. 2. It is also apparent that the height of said stream tube progressively decreases as the hollow air inlet member 16 is rotated from its position of Fig. 1 to that of Fig. 2 although the width of said stream tube is the same in all positions of rotative adjustment of the inlet extension member 16. Thus Fig. 1 illustrates the position of the air inlet extension member 16 for maximum frontal air inlet capture area and Fig. 2 illustrates the position of the air inlet member 16 after rotation of 180° from its position of Fig. 1 and shows the position of said inlet member 16 for minimum frontal air inlet capture area.

This variation in the capture area of the stream tube of air capable of entering the inlet member 16 as said member is rotated results from the fact that the axis of rotation of said member 16 is inclined to the direction of the approaching air and from the fact that the leading edge of said member is inclined to said axis of rotation. Obviously, the magnitude of this range of air inlet capture area depends on the magnitude of the angles A and B, said inlet capture area range increasing with decrease of angle A and with increase of angle B. The angle B, however, is kept small to avoid excessive aerodynamic drag. For example, the angles A and B may be of the order of 30° and 5° respectively. The magnitude of these angles will depend however on the particular engine and performance desired.

Referring now to Fig. 3, the air inlet member 16 is illustrated as being supported by a cylindrical rear portion 22 received within a sleeve extension 24 of the engine 12 for rotatably supporting said member 16. The inner wall 26 of the inlet member 16 forms a smooth continuation of the corresponding inner wall 28 of the engine housing to form a smooth convergent-divergent entrance 30 for the engine air intake passage 32. The engine 12 is provided with an axially-slidable plug 34 extending forwardly into the throat of said convergent-divergent entrance 30. With this construction axial adjustment of the plug 34 is effective to vary the inlet throat.

Any suitable motor means may be provided for axially adjusting the plug 34 as is well known in the art.

In order to provide for rotative adjustment of the air inlet extension 16, an annular gear 36 is secured to said extension at its rear end. A motor 38 mounted within the housing of the engine 12 is provided with a pinion 39 disposed in mesh with the gear 36 whereby the motor 38 is operable to effect rotative adjustment of the air inlet extension 16.

As already mentioned, a compound power plant, such as one comprising the combination of a ramjet and a turbojet engine, generally requires a wide range of air flow. Figs. 4–7 illustrates one application of the invention to such a power plant.

In Fig. 4 reference numeral 40 designates the wing or other portion of a supersonic aircraft from which a compound power plant 42 is supported by a strut 44. The power plant 42 comprising an outer housing shell 46 and an inner shell 48 forming an annular passage 50 therebetween. The passage 50 forms the air entrance passage for the ramjet engine of the power plant 42. Except for its air entrance passage 50 no details of the ramjet engine are shown. The turbojet engine 52 of the power plant 42 is supported within the inner shell 48 and has a central nose or plug member 54 extending co-axially forwardly therefrom so that the turbojet air entrance passage 56 within the shell 48 is annular.

A hollow air inlet extension 58 forms a smooth and co-axial forward extension of the front end of the engine housing 46. The hollow extension 58 is supported for rotation about its axis 60. The support and means for rotating the member 58 may be similar to that illustrated for the hollow extension 16 in Figs. 1–3. The inner surface of the hollow extension 58 forms a smooth continuation of the inner surface of the housing 46 to form an air inlet passage 62 having a convergent-divergent profile as illustrated.

The hollow air inlet extension 58 has a sharp leading edge to the approaching air and the major portion 64 of this inlet has its leading edge cut back along a plane inclined to the axis 60 at an angle C. Because the inlet of Fig. 4 has a center plug 54 on the axis 60 about which the inlet extension 58 is rotatable, the throat of the convergent-divergent passage 62 must be symmetric with respect to the axis 60. For this reason the hollow inlet extension 58 preferably has a small portion 6 diametrically opposite to the portion 64 and oppositely cut back in order to shorten the length of the inlet extension otherwise required for fairing the short portion of the inlet extension 58 into the inlet throat. Thus if the entire leading edge of the hollow inlet extension 58 were cut back as in Figs. 1–3 then said member 58 would have to be lengthened if the inner surface of its passage 62 on its short length side were for example to converge to the inlet throat at the same angle to the axis 60 as that illustrated.

In Fig. 4, as in Figs. 1–3, the front end of the engine 42 is disposed so that the axis 60 of its inlet 62 is disposed at a small angle D to the approaching air. With this construction of Fig. 4, the cross-sectional area of the stream tube 68 of the air entering the hollow inlet extension 58 will vary as said extension is rotated about its axis. That is, rotation of the hollow inlet extension 58 is effective to vary its frontal air inlet capture area. This capture area varies from a maximum in the position illustrated to a minimum in 180° of rotation of the hollow extension member 58 from said position.

As in Figs. 1–3 the inlet plug 54 preferably is made axially adjustable, for example, between its full line and its dot and dash line positions illustrated in Fig. 4.

An axially slidable sleeve valve 70 is mounted on the inner shell 48. Any suitable means (not shown) may be provided for axially sliding the sleeve valve 70. Fig. 4 illustrates, in full lines, the sleeve valve 70 in a rearward position with its forward or lip portion 72 engaging the center plug 54 adjacent to its maximum diameter portion. In this full line position of the sleeve valve 70, said valve closes the turbojet entrance passage 56 and opens the ramjet entrance passage 50 to the air inlet passage 62. The sleeve valve 70 is slidable axially forwardly from its full line position to its dot and dash line position in which its forward or lip portion 72 engages the wall of the passage 62. In this forward position of the sleeve valve 70 it closes the ramjet entrance passage 50 and opens the turbojet entrance passage 56 to the air inlet 62.

As illustrated in Fig. 4, when the slidable valve 70 is in a rearward position for ramjet operation, its lip 72 forms a smooth continuation of the forward surface of the plug 54. During turbojet operation when the valve 70 is in its forward position, the inward turning of its lip 72 is such as to avoid impingement of shock waves from said lip portion on the plug 54. It should be noted that although sleeve valve 70 has only one forward position for turbojet operation as limited by the wall of the inlet 62, its rearward position for ramjet operation is determined by the position of the axially adjustable plug 54.

In Fig. 4 the inlet of the ramjet-turbojet engine has three adjustable members, the rotatable inlet extension 58, the axially adjustable plug 54 and the axially adjustable sleeve 70. Figs. 8–10 illustrate a simpler modification having but two adjustable members but at some sacrifice in performance.

In Figs. 8–10, reference numeral 80 designates a wing or other surface portion of a supersonic aircraft from which a compound ramjet-turbojet power plant 82 is supported by a strut 84. The power plant 82 comprises an outer housing or shell 86 and an inner shell 88 forming an annular passage 90 therebetween. The passage 90 forms the air entrance passage from the ramjet engine of the power plant 82 and its forward portion is divided into a plurality of axially-extending sections 91 by radial strut-like vanes 92. The turbojet engine 94 of the power plant 82 is supported within the shell 88 and said shell forms the air entrance passage 96 for said turbojet.

A hollow air inlet extension 98 forms a smooth and co-axial forward extension of the front end of the engine housing 86. The hollow extension 98 is supported for rotation about its axis 100 for example as illustrated for the corresponding member 16 in Figs. 1–3.

The interior of the hollow extension 98 has two passages 102 and 104 at its rear end. The passage 102 is co-axial with the axis 100 at its rear end and forms a forward continuation of the turbojet passage 96. The passage 104 has a cross-section which is shaped as segment of an annulus of such size that the passage 104 is arranged to communicate with a portion of the ramjet entrance passage 90.

The hollow extension member 98 also has an inlet passage portion 106 at its upstream end which is arranged to communicate with either of its passages 102 or 104 depending on the position of a flap valve 108 pivotally supported therein. In its full line position (Fig. 8) the flap valve 108 closes the passage 102 and opens the passage 104 to the inlet 106. Hence, in the full line position of the valve 108 it is positioned for ramjet operation and in this position the valve 108 smoothly interconnects the inner surface of the inlet 106 with the passage 104. In its dot and dash line position the valve 108 is positioned for turbojet operation and in this position said valve forms a smooth continuation of one side of the passage 102 to the lip of the hollow air inlet extension 98 so that the passage 102 and inlet 106 are in communication.

As in Fig. 4, in Fig. 8 the major portion 110 of the hollow extension member 98 has its leading edge cut back at an angle E to the axis 100 of said member and the remaining diametrically opposite portion 112 is oppositely cut back. Here again the purpose of this construction as compared to that of Figs. 1–3 is to reduce the length of the hollow member 98. Thus if the entire leading edge of the hollow member 98 were inclined at the angle E said edge would have to be moved forwardly sufficiently so that it would be entirely upstream of the valve 108 when said valve is in its dot and dash line position. Also in Figs. 8–10 the axis of rotation 106 of the hollow extension member 98 is inclined at a small angle F to the approaching air. Hence, as in the other modifications, rotation of the hollow air inlet extension member 98 is effective to vary the capture area of the entering air stream tube 114.

In the case of ramjet operation, the ramjet inlet throat is varied in dependence on the rotative position of the hollow extension member 98. As the hollow inlet member 98 is rotated to vary the inlet capture area the inlet passage 104 communicates successively with different sections 91 of the ramjet passage 90. Accordingly, by varying the radial height of the passages 91 between the vanes 92, the throat area of the ramjet entrance passage is varied as the hollow inlet member 98 is rotated. At the downstream ends of the vanes 92, the ramjet air flows from between certain vanes 92 (depending on the position of the rotatable inlet member 98) into the annular ramjet entrance 90.

In the case of turbojet operation, however, (valve 108 in its dot and dash line position) the air inlet throat has a fixed area with the construction illustrated in Figs. 8–10.

Figs. 11 and 12 illustrate a further simplification in which the throat area for both ramjet and turbojet operation is fixed.

In Figs. 11 and 12, reference numeral 120 designates a wing or other surface portion of a supersonic aircraft from which a compound ramjet-turbojet power plant 122 is supported by a strut 124. The power plant 122 comprises a housing shell 126 having an internal partition 128 dividing said housing into an air entrance passage 130 for a ramjet engine and an air entrance passage 132 for a turbojet engine 134. The upstream end of each passage 130 and 132 is substantially semicircular so that at their upstream ends the two passages 130 and 132 together form a circle divided by the partition 128.

A hollow air inlet member 136 co-axial with the forward end of the housing 126 forms a smooth forward extension of said housing. The hollow air inlet member is supported for rotation about its axis 138 for example as illustrated for the corresponding member 16 in Figs. 1–3.

The hollow inlet member 136 has a single passage 140, the downstream end of which is semi-circular as shown in Fig. 12. In the position illustrated, the passage 140 registers with the ramjet entrance passage 130 for ramjet operation. When the member 136 is rotated 180° to its dot and dash line position of Fig. 11 its passage 140 registers with the turbojet entrance passage 132 for turbojet operation.

The leading edge of the hollow inlet member 136 of Fig. 11 is cut back in a manner similar to the inlet members of Figs. 4 and 8. Thus the major portion 142 of the hollow inlet member 136 is cut back along an angle G to its axis 138 while the remaining portion 144 has its leading edge oppositely cut back. Here again the reason for not cutting back the entire leading edge of the hollow inlet member 136 at the one angle G is merely to shorten this member. Thus, as is quite obvious from Fig. 11 if the entire leading edge of the member 136 were cut back along the angle G it would have to be lengthened in order to provide a complete annulus of material about its passage at the downstream end of said member.

As in the previously described modifications, the front end of the engine 122 is supported so that its axis 138 is inclined at a small H to the approaching air. In this way, as in said other modifications, rotation of the hollow air inlet member is effective to vary the capture area of the entering air stream tube 146. As is apparent from Fig. 11, the capture area of the inlet is a maximum for ramjet operation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. An air breathing jet engine having a front end portion with a forwardly directed air entrance passage; and a hollow member forming a forward extension of said end portion and its entrance passage so that air enters the engine through said hollow member, said hollow membr being rotatable and its axis of rotation being inclined to at least a portion of its leading edge so that, with air approaching said hollow member at an angle inclined to said axis, rotation of said member is effective for varying the air inlet capture area.

2. An air breathing jet engine as recited in claim 1 in which said hollow member has a sharp leading edge to the entering air flow and forms a smooth continuation of said front end portion.

3. An air breathing jet engine having a front end portion with a forwardly directed air entrance passage, and a hollow member forming a forward air inlet extension of said front end portion and its entrance passage so that air enters the engine through said hollow member, said hollow member being rotatable and at least a portion of its leading edge being inclined to the axis of rotation of said hollow member so that, with air approaching said hollow member at an angle inclined to the axis of rotation of said member, rotation of said member is effective to vary the cross-sectional area of the stream tube of air capable of entering said member.

4. An air breathing engine as recited in claim 3 in which at least the major portion of the leading edge of said hollow member lies in a plane inclined to the axis of rotation of said hollow member.

5. An air breathing engine as recited in claim 3 and including a plugtype member extending forwardly into said hollow member and being axially movable for regulating the throat area of said inlet passage.

6. A combination ramjet and turbojet power plant comprising a front end portion having a forwardly directed air entrance passage for the ramjet and a forwardly directed air entrance passage for the turbojet; and a hollow member forming a forward extension of said front end portion and providing an air inlet for both said passages; said hollow member being rotatable and its axis of rotation being inclined to at least a portion of its leading edge so that, with air approaching said hollow member at an angle inclined to said axis, rotation of said member is effective to vary the inlet capture area.

7. A combination ramjet and turbojet power plant comprising a front end portion having a forwardly directed air entrance passage for the ramjet and a forwardly directed air entrance passage for the turbojet; and a hollow member forming a forward extension of said front end portion and providing an air inlet for both said passages, said hollow member forming a smooth continuation of said front end portion and said hollow member being rotatable and its axis of rotation being inclined to at least a portion of its leading edge so that, with air approaching said hollow member at an angle inclined to said axis, rotation of said member is effective to vary the inlet capture area.

8. A combination ramjet and turbojet power plant comprising a front end portion having a forwardly directed air entrance passage for the ramjet and a forwardly directed air entrance passage for the turbojet; and a hollow member forming a forward extension of said front end portion and providing an air inlet for both said passages; said hollow member being rotatable and its axis of rotation being inclined to a major portion of its leading edge so that, with air approaching said hollow member at an angle inclined to the axis of rotation of said member, rotation of said member is effective to vary the cross-sectional area of the stream tube of air capable of entering said member.

9. A combination ramjet and turbojet power plant as recited in claim 6 in which the major portion of the leading edge of said hollow member lies substantially in a plane inclined to the axis of rotation of said hollow member.

10. A combination ramjet and turbojet power plant as recited in claim 6 and including valve means movable for directing air flow from said hollow member to either of said air entrance passages.

11. A combination ramjet and turbojet power plant as recited in claim 6 and including movable valve means carried by and movable relative to said hollow member such that in one position of said valve means said inlet communicates with said ramjet entrance passage and in the other position of said valve means said inlet communicates with said turbojet entrance passage.

12. A combination ramjet and turbojet power plant as recited in claim 6 and including valve means movable for directing air flow from said hollow member to either of said air inlet passages and in which rotation of said hollow member is effective to vary the throat area of said ramjet passage.

13. A combination ramjet and turbojet power plant comprising a forwardly directed air entrance passage for the turbojet and a forwardly directed air entrance passage for the ramjet; and means including a hollow member forming a common forwardly-extending air inlet passage for both said ramjet and turbojet entrance passages, said member being rotatable so that in one position said inlet passage communicates with the ramjet entrance passage and is out of communication with the turbojet entrance passage and in another position of said rotatable member said inlet passage communicates with the turbojet entrance passage and is out of communication with the ramjet entrance passage, the axis of rotation of said hollow member being inclined to at least a portion of its leading edge so that, with air approaching said hollow member at an angle inclined to said axis, rotation of said rotatable member also is effective to vary the capture area of the stream tube of air capable of entering said common inlet passage such that said capture area is a maximum for ramjet operation.

14. A combination ramjet and turbojet power plant comprising a forwardly directed air entrance passage for the turbojet and a forwardly directed air entrance passage for the ramjet surrounding said turbojet air entrance passage; means including a hollow member forming a common forwardly-extending air inlet passage for both said ramjet and turbojet entrance passages, said member being rotatable and its axis of rotation being inclined to at least a portion of its leading edge, so that, with air approaching said hollow member at an angle inclined to said axis, rotation of said member is effective for varying the air inlet capture area of said common inlet passage; means operable for varying the throat area of said common inlet passage; and means operable for directing air flow from said common inlet passage to either of said air entrance passages.

15. A combination ramjet and turbojet power plant comprising a forwardly directed air entrance passage for the turbojet and a forwardly directed air entrance passage for the ramjet surrounding said turbojet air entrance passage; means including a hollow member forming a common forwardly-extending air inlet passage for both said ramjet and turbojet entrance passages, said member being rotatable and its axis of rotation being inclined to at least a portion of its leading edge, so that, with air approaching said hollow member at an angle inclined to said axis, rotation of said member is effective for varying the air inlet capture area of said common inlet passage, said common inlet passage having a convergent-divergent cross-sectional area; a plug member extending forwardly into said common inlet passage and being axially movable for varying the throat area of said common inlet passage; and an axially movable sleeve member having a forward position in which its forward end engages the wall of said inlet passage to close said ramjet entrance passage and open said turbojet entrance passage to said common inlet and having a rearward position in which its forward end engages said plug member to close said turbojet entrance passage and open said ramjet entrance passage to said common inlet.

References Cited in the file of this patent

UNITED STATES PATENTS

| | | |
|---|---|---|
| 1,419,316 | Sherbondy | June 13, 1922 |
| 2,696,078 | Waitzman | Dec. 7, 1954 |
| 2,867,978 | Peterson | Jan. 13, 1959 |